Aug. 5, 1952 H. T. BURKEY 2,605,742
METHOD AND APPARATUS FOR DIVERTING ANIMAL FORMS OF LIFE
Filed Feb. 9, 1945 2 SHEETS—SHEET 2
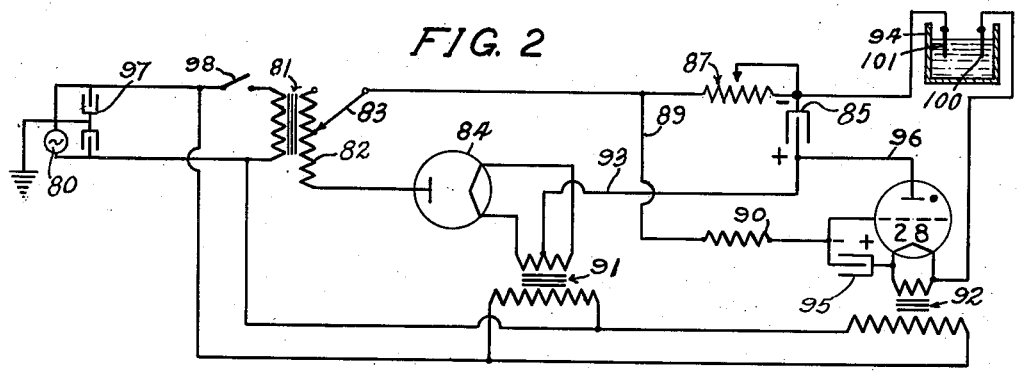
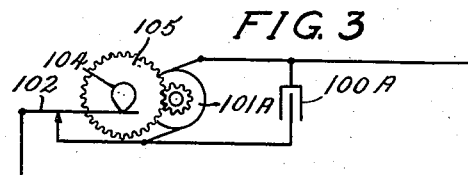
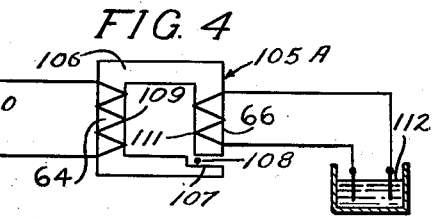
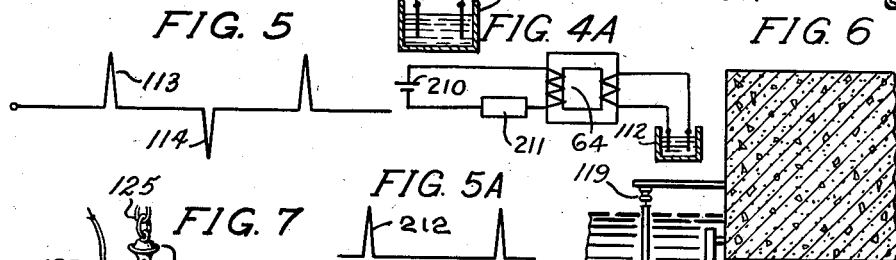
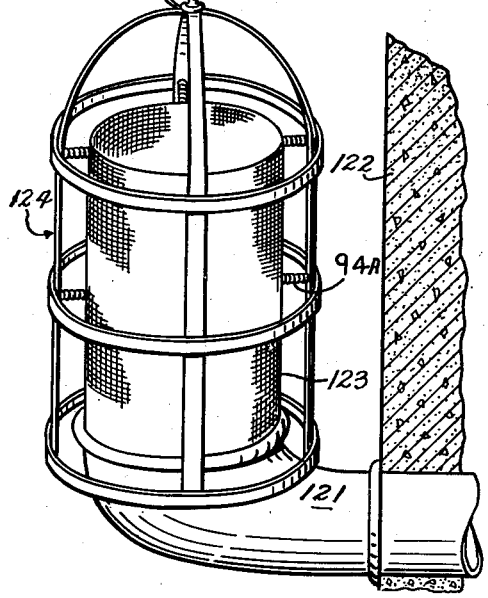
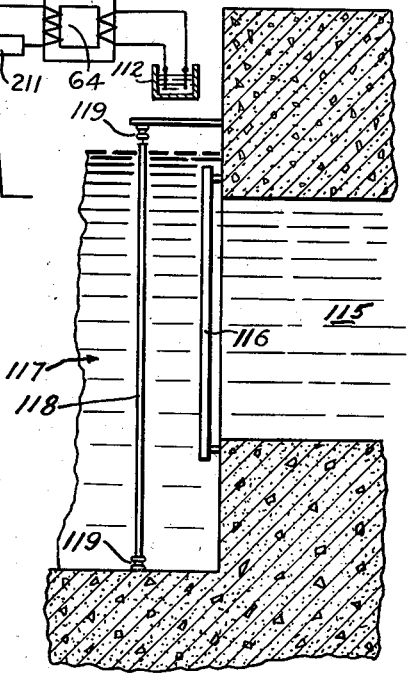
INVENTOR.
HENRY T. BURKEY
BY
Attorney Patented Aug. 5, 1952

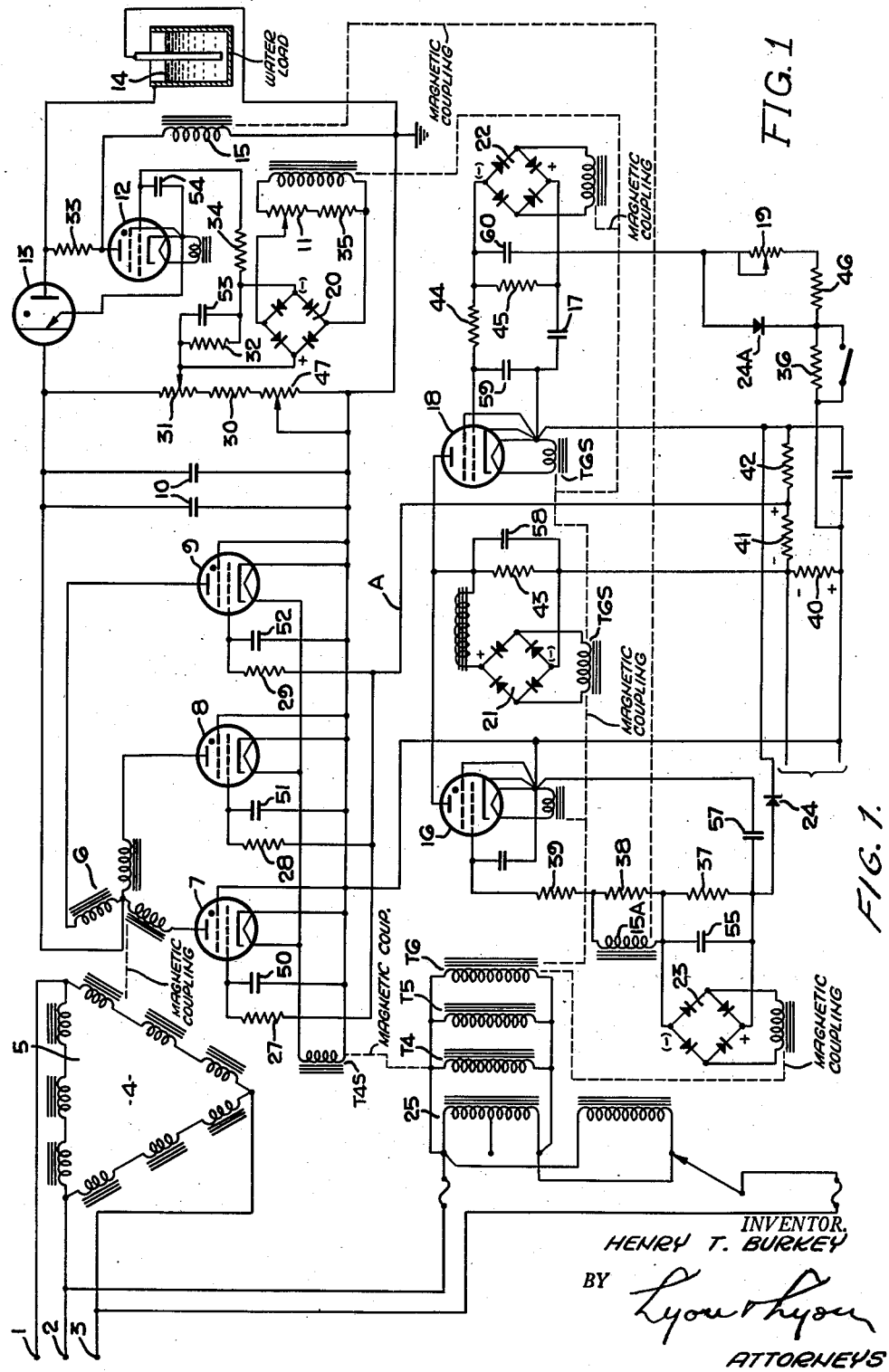

2,605,742

UNITED STATES PATENT OFFICE 2,605,742

METHOD AND APPARATUS FOR DIVERTING ANIMAL FORMS OF LIFE

Henry T. Burkey, Hollywood, Calif.

Application February 9, 1945, Serial No. 577,080

1 Claim. (Cl. 119—3)

My invention relates to a method and apparatus for electrically charging a zone of water to divert, control and/or conserve animal forms of life, as distinguished from vegetation. Such zones are generally electrically charged water for use with fish, aquatic mammals, star fish, water fowl, teredos and like marine worms and insects, which in certain stages of their life cycle inhabit water. My invention also includes charging certain somewhat solid materials having a water or electrolyte component, with an appreciable electrical load resistance. Thus some rodents and other land dwelling animals may be controlled as noted in the detailed description.

My present invention relates to improvements in the methods and apparatus developed in my United States patents: 1,269,380 of June 11, 1918; 1,292,246 of January 21, 1919; 1,515,547 of November 11, 1924; 1,882,482 of October 11, 1932, and 1,974,444 of September 25, 1934.

A phase of my present invention relates to the commercial economy and lower cost of the electric current used, together with charging water zones of much larger volume. This is accomplished by use of intermittent peaked electrical waves of increased voltage and amperage. Where such type of electrical wave form is used the time period between individual peaks is adjusted and maintained to prevent physiological "tetanus" and provide periods of relief from shock as described in my Patent 1,974,444, when it is desired to control and conserve aquatic life.

For the immediate, above noted purpose I have developed an electrical wave form with peaks of short time duration compared with the effective time of wave cycle and the time period of low or no current flow. The wave form may be unidirectional, i. e., in one direction or bidirectional, i. e., of alternating or reverse polarity. I have developed apparatus and methods of obtaining the desired wave form by capacitor discharge into the water zone. The capacitor discharge may be controlled electronically or mechanically. I also produce a suitable electrical wave form by the use of an impulse or peaking type of transformer energized with a low frequency A. C. source of power or interrupted D. C.

In my invention I electrically energize a water zone of moderate electrical resistance. When the peaked wave is obtained by a capacitor discharge, such discharge is almost instantaneous. In a water zone of high mineral content, as sea water, which has much lower electrical resistance than fresh water, the capacitor control is adjusted and maintained to give a quick discharge rather than to "bleed" the current flow gradually into the water. In a fresh water zone the control of the electrical wave must be adjusted and maintained to also produce individual sharp peaks, spaced by time periods of no or negligible current flow.

Due to the relatively short time period of the individual peak portion of the electrical wave, much higher voltages and amperages may be used than formerly and this with economy of total wattage consumption. For example, in accordance with the teachings of the present invention the electrical wave is of shortest possible duration and in certain installations of the type described herein the peak voltage applied may be of the order of 800 volts at a rate of four to eight impulses per second, the peak current flow being 80 amperes when the resistance of the component water zone is ten ohms. Even with unidirectional current flow there is negligible electrolytic action on the electrodes, even in sea or other mineral containing waters.

The electrical shock to fish is greater when the flow of electric current is lengthwise of the fish than when crosswise through the body. The reason for this appears to be that the body structure of the fish is a better electrical conductor than the volume of water displaced. Due to the conductivity of fish being greater than the water displaced, the current in such space follows the path of least electrical resistance, which is lengthwise through the fish. In a specific electrified zone when a large fish enters such zone it feels and reacts to the shock before a smaller fish entering the same zone. This is apparently due to the greater surface contact and larger body volume of the large relative to the small fish.

Hence with my improved electrification of the water zone I am less dependent on the electric current and flow of water being in the same direction, as described in my Patent 1,882,482. My improved wave form, with increased voltage and amperage makes possible the charging of a larger zone of water and hence subjects fish to shock in localities where the direction of water flow is immaterial. When water flow is swift fish usually are carried with the water or swim against the flow. My improved electrified zone may be used to shock fish, and yet let them swim outside of the highly charged zone before the force of water flow carries them too deeply into the charged zone or past the fish diverter. This conduces to conservation of fish life.

In most places where fish diverters are installed the line of travel of such fish may be determined and pairs of electrodes or electrode and ground may be so placed that the fish receive the greatest shock when lengthwise with the lines of electric current flow.

The capacitor discharge in my present preferred form uses as source of power A. C. three phase, stepped up by a three phase transformer to a much higher voltage than the source. The current is rectified to be uni-directional and charges one or more capacitors. The capacitor discharge to the load i. e. the water, is through an electronic relay known commercially as an "ignitron." The ignitron discharge is controlled by an electronic grid controlled tube such as a Thyratron. The Thyratron tube may be of the General Electric type FG57 or one of the Westinghouse types WL631, or KU628, while the "ignitron" type of tube may be of Westinghouse type WL631/686. With suitable electrical connections the equipment produces the impulse timing desired, which may be preset and adjusted manually. The capacitor discharge, voltage and amperage, may also be manually preset and adjusted.

Another form of capacitor discharge device uses as a source the common 110 volt A. C. service, transformed to suitable higher voltage, rectified to uni-directional current, which charges the capacitor. The capacitor discharge to load, i. e., water, is through an electronic relay of the Thyratron type, the grid of which is maintained at a suitable bias by a potential source such as a "C" battery or A. C. suitably rectified and adjusted by a potentiometer.

A simple capacitor discharge, uses D. C. to charge the capacitor, which is intermittently discharged mechanically into the water load. For instance a hand operated generator, for a second or so charges the capacitor and by a suitable circuit closer causes a practically instantaneous capacitor discharge.

The impulse or peaking transformer uses a suitable low frequency source of power, a step up transformer, the secondary of which is connected to the load. This provides a water zone charged alternately positive and negative with a sharply peaked wave, with a considerable time period between the peaks.

My electrical control equipment provides for a ready change from physiological non-tetanizing to tetanizing water zones. When the frequency of discharge to load is increased, without any change in wave form, the accumulative effect becomes more severe. This as to fish, teredo worms, aquatic fowls and like is apparently due to causing physiological tetanus, as noted in my Patent 1,974,444, mentioned above.

My present development of the wave form characterized by a steep or peaked wave of much higher voltage than formerly, enables me to dispense with insulating either or both electrodes. In such case as explained previously, the peak waves are of shortest possible duration, recurring four to eight times per second and having, for example, a peak voltage of 800 volts. I may have both electrodes electrically grounded and positioned remote from each other at a much greater distance than the space of water which carries an electrical charge of sufficient strength to cause fish to avoid such space. For instance one electrode may be immersed in water and the other embedded in earth or soil a relatively small distance from the body of water. Again both electrodes may be installed in the water, one or both insulated electrically from the ground, and remote one from the other. Both electrodes may be immersed in water and both electrically grounded and displaced one from the other.

My theory is that when both electrodes are grounded a portion of the current is by-passed through the ground between the electrodes, but that sufficient current passes through the water to stop or divert fish and the like. Where only one electrode is grounded the effect is much the same. Where both electrodes are insulated from the ground and disposed in the water most of the current flow is usually through the water.

The electrical current action or effect in water in proximity to one or both of the immersed electrodes is due to the relatively high voltage and current density resulting from the application of relatively high voltages of relatively short duration in accordance with the teachings of the present invention. In such case an electric field is set up of such magnitude in regions or zones removed from the immediate vicinity of the space between electrodes to thereby produce an appreciable effect on animal forms of life, such as fish, in such removed regions or zones. Fish and the like are deterred from entering or remaining in such higher electrified zone or region removed from the immediate space adjacent electrodes.

Electric current in a water zone, between two electrodes of different potential, or between one electrode in the zone and a remote ground tends to travel the path of greatest electrical conductivity. However with my individual peaked type of electrical wave and almost instantaneous discharge to the water zone load, there is electrical current flow in the zone space in addition to the current flow in the path of greatest electrical conductivity.

The energized zone in proximity to the energized electrode appears to spread from such electrode. Hence there is electrical current flow through the body of fish or aquatic animals even though such fish or aquatic animals be outside of the path of greatest electrical conductivity between the electrodes of differing potential. My improved electrical wave form of a sharply peaked high intensity voltage in a sequence of individual peaks produces a greater expanse of electrically energized volume of water than in the former practice. Hence fish and aquatic animals are subject to the electrical shock, when at greater distances from an energized electrode than in former procedures. This results, for instance, in a certain volume of water, a larger proportion of the fish or aquatic animals receiving the electrical shock lengthwise through the body than with former methods and apparatus. Therefore due to the spread condition of electrical current flow in the water zone the diverting action on fish or aquatic animals is more pronounced, at less cost in power, than the former procedure. In my present improved practice the electric current flow in the energized water zone is in directions additional to the path of greatest electrical conductivity between two electrodes of different potential.

My type of water electrode equipment varies as to the kind of fish, water fowl, insect or worm life to be controlled, and the type of wave form and frequency also varies accordingly. In the control of fish the electrodes are usually suspended in or immersed to the desired depth in the water. Water fowl may usually be kept out of designated areas by electrode systems carried by floats near the surface. The caddis-fly larvae are usually killed or loosened from the surface of flumes, tunnels, water pipes, etc., by using electrodes embedded, usually grouted, in the concrete of the wall surface. By using flush surface electrodes the friction to water flow is not increased. Teredoes and other aquatic worms are prevented from infesting under water wood structures by electrodes on the surface of such structures.

In my present invention, in many instances, I make use of some but not all equipment commonly used or installed. Water diversion flumes, intakes to municipal water services, etc. are now commonly provided with trash racks or screens at the intake. With my invention fish may be kept at such a distance from the trash racks or screens that the water flow will not suck and hold them against the rack or screens. Without the use of my equipment diverted water and domestic water frequently becomes contaminated with decomposed fish held against trash racks, or screens by force of water flow. As the present trash racks and screens usually make a good electrical ground I make use of the same. In this latter case my energized, i. e., insulated electrodes are usually spaced a distance from the trash racks or water screens. When energized the electrified zone extends in greatest strength between the electrodes and the grounded trash racks or screens and in lesser strength outwardly beyond the energized electrodes.

Where electrodes alone are used these are arranged connected in a desired sequence to opposite electrical leads from the control discharge equipment. This arrangement with consecutive electrodes of opposite polarity produces overlapping zones of water electrically charged, during the current flow. With flush surface electrodes it is usually desirable to have consecutive electrodes of opposite potential. I also employ improved equipment of a grounded electrode, usually on the bottom of body of water, with suspended, or wall attached energized electrodes. As both the energized, i. e., insulated electrodes and the grounded electrodes cause an energized zone beyond the electrode line the energized electrodes may, when necessary be located down stream from the trash rack. This is usually only necessary when the trash racks can have no obstruction to navigation, floating logs, etc.

My invention is illustrated in connection with the accompanying drawings, in which:

Fig. 1 shows an electrical diagram of circuits, with symbols, for a 3 phase A. C. supply using electronic controlled capacitor discharge in accordance with the present invention.

Fig. 2 is an electrical diagram of a power unit having single phase A. C. supply, electronic controlled capacitor discharge in accordance with the present invention.

Fig. 3 is an electrical diagram of a D. C. supply and capacitor discharge equipment, mechanically controlled, embodying certain features of the present invention.

Fig. 4 is an electrical diagram of a peaking transformer for charging water from the secondary winding thereof in accordance with certain teachings of the present invention.

Fig. 4A shows a transformer unit connected to realize certain features of the present invention.

Fig. 5 shows an electrical wave form developed by use of the apparatus shown in Fig. 4.

Fig. 5A shows an electrical wave form developed by use of apparatus shown in Fig. 4A.

Fig. 6 illustrates an insulated electrode grid with grounded trash rack or screen in proximity to a water duct in accordance with certain features of the present invention.

Fig. 7 illustrates an insulated electrode grid, with a grounded screen in proximity to a saucer valve water inlet in accordance with certain features of the present invention.

In Figure 1 power is supplied from a three phase circuit 1, 2, 3 to a three phase transformer 4 having a delta connected primary winding 5 and a star connected secondary winding 6. The high voltage current obtained from the secondary winding 6 is rectified by three phase, half-wave rectifier tubes 7, 8, 9 and charge a bank of capacitors 10. When the charge voltage across the capacitor bank 10 reaches its adjustable, preset, value, as determined by potentiometer 11, the bias on the control grid of Thyratron tube 12 causes this Thyratron tube 12 to ignite the series electronic relay ignitron type tube 13, discharging the stored energy from the capacitors 10 into the water load circuit 14.

At the instant of igniting the series ignitron tube 13 the current flowing through the firing Thyratron tube 12 causes a voltage drop to appear across an impulse transformer 15. This impulse is used to cause Thyratron tube 16 to block the main rectifier tubes 7, 8 and 9 during the period of discharging capacitor bank 10. The blocking time and consequently the rate of operation is made adjustable by altering the rate of charging a capacitor 17 in the grid circuit of Thyratron tube 18. Thyratron tube 18 unblocks the main rectifier tubes 7, 8 and 9 and automatically sets up the sequence circuit for causing Thyratron tube 16 to again block the main rectifier tubes 7, 8 and 9 during the next operating cycle. This feature automatically clears faulty operation of the discharge circuit, between the capacitor bank 10 and the water load circuit 14. A potentiometer adjustment 19 is provided for varying the blocking time of the main rectifier tubes 7, 8 and 9 and consequently the rate of operation of the control circuit.

Specifically, the Y-connected secondary winding 6 has its unconnected terminals connected respectively to the anode or plate of the Thyratron discharge devices 7, 8, 9, the common terminal of the secondary winding 6 being connected to one terminal of the water load circuit 14 through the ignitron device 13 while the other terminal of the water load circuit 14 is connected to the grounded cathodes of devices 7, 8 and 9. The main control grids of devices 7, 8 and 9 is each connected through current limiting resistances 27, 28 and 29, respectively, to the control lead A whose potential is important in determining the operation of devices 7, 8 and 9. Control lead A is connected to the grounded cathodes of devices 7, 8 and 9 through the serially connected resistances 41 and 40, resistances 40 and 41 providing an input circuit for the devices 7, 8 and 9. The voltage across resistance 40 is determined by the amount of space current flowing through the blanking device 16 while the magnitude of the potential existing across resistance 41 is determined by the space current flowing through the triggering device 18. It is noted that the voltages existing across resistances 40 and 41 are of opposite polarity as indicated by the plus and minus signs in the sense that the voltage applied between the main control grids of devices 7, 8 and 9 and their common cathodes is equal to the difference in voltage existing across the resistances 40 and 41. It is noted further that the voltage existing across resistance 40 has a polarity tending to block the flow of current in tubes 7, 8 and 9 while the potential existing across resistance 41 does either in fact or tend to cause the Thyratron tubes 7, 8 and 9 to fire.

Space current for each one of the devices 16 and 18 is obtained from the full wave rectifier 21, the positive output terminal of which is connected to the plates of the devices 16 and 18 while the negative terminal of the rectifier 21 is on the one end connected to the cathode of device 16 through resistance 40 and on the other end to the cathode of device 18 through the serially connected resistances 41 and 42.

It is noted that the secondary winding 15A, which is magnetically coupled to its primary winding 15, is connected between the main control grid and the cathode of the device 16 to cause the tube 16 to fire upon the transfer of an energy pulse from winding 15 due to magnetically coupled secondary winding 15A.

The Thyratron device 16 is so adjusted that it does not fire until the energy pulse is transmitted to the primary winding 15, and upon that occurrence a relatively large amount of current flows through resistance 40, thereby to render the control lead A substantially negative to cause tubes 7, 8 and 9 to block.

While such relatively large amount of current flows through resistance 40 the potential drop thereacross of course is relatively large and this potential drop is applied to the main control grid of device 18 through resistances 36, 46, 19 and 44 and condenser 60. It is noted that the main control grid of device 18 does not fall instantaneously. The potential variations across resistance 40, due to the presence of the condenser 60, may be charged at a variable rate by adjustment of the variable resistance 19. After a predetermined period of time the main control grid of device 18 becomes sufficiently positive due to the relatively large positive voltage across resistance 40 and the device 18 fires, thereby to cause a relatively large space current to flow through resistance 41 to make the control lead A of sufficient positive potential to allow the devices 7, 8 and 9 to fire when their anode voltages assume a predetermined value during a cycle of the alternating currents in winding 6. It is noted that in the recurrent cycles of operations of devices 16 and 18, control over lead A is alternately transferred between devices 16 and 18. When device 16 is fired its control grid assumes a relatively large positive potential and such large positive potential is transferred through rectifier 24 to the cathode of device 18, thereby to minimize the difference between its anode and cathode, while on the other hand a similar effect appears when device 18 is fired due to the rectifying device 24A connected between the main control grid of device 18 and the cathode of device 16. Thus, when devices 7, 8 and 9 are fired a relatively large energy pulse is transferred to the main control grid circuit of device 16 through the secondary winding 15A thereby to cause a large current to flow through resistance 40 to render the control lead A sufficiently negative to make devices 7, 8 and 9 nonconducting. This relatively large voltage across resistance 40 is transferred to an integrating circuit in the grid circuit of device 18 thereby to cause the device 18 to fire a predetermined period of time after device 16 is fired. When device 18 is fired the device 16 carries no appreciable current inasmuch as there is no energy pulse present in the secondary winding 15A and due to the fact that the difference in potential between the anode and cathode of device 16 is minimized. Consequently control lead A after device 18 is fired assumes a relatively large potential thereby to allow devices 7, 8 and 9 to fire again.

Miscellaneous resistors and capacitors are used throughout the unit to properly balance the circuits and give the necessary control as outlined above. Dry type rectifiers 20, 21, 22, 23 and 24 are used to supply all grid bias as well as plate voltage on Thyratron tubes 16 and 18.

Certain electrical values I have found satisfactory with the circuits of Figure 1 and elements thereof are:

Resistors and potentiometers in ohms 27—75,000; 28—75,000; 29—75,000; 30—24,000; 31—3,000; 32—2,000; 33—15; 34—75,000; 35—2,000; 36—25,000; 37—100,000; 38—20,000; 39—100,000; 40—3,800; 41—2,000; 42—2,000; 43—5,000; 44—100,000; 45—100,000; 46—2,000; 47—3,000; 19—25,000; 11—2,500. Capacitors in microfarads 50—.01; 51—.01; 52—.01; 53—2.0; 54—.01; 55—2.0; 56—.002; 57—1.0; 58—10.0; 59—.002; 17—4.0; 60—2.0; 10—225, each.

In Figure 1 T4, T5 and T6 represent primary windings of a power transformer while the windings have the same reference numeral with the letter "S" added signify that they are magnetically coupled and form secondary windings; for example, T4S is a secondary winding having a winding T4 as a primary winding; T6S is a secondary winding of a transformer having T6 as a primary winding and T6S as a secondary winding, etc. The circuit parameters given above apply when the apparatus is connected to a source of 60 cycles alternating voltage having an effective value of 230 volts.

In Figure 2 an A. C. single phase source 80 (110 v.) is connected to a step up transformer 81, the secondary 82 being provided with voltage setting taps and switch 83. The half-wave rectifier 84 charges the capacitor 85 each half-wave cycle. The charging rate of capacitor 85 is regulated by adjustable rheostat 87.

The grid controlled tube 28 of the Thyratron type has its grid bias preset by a connection 89 to one terminal of switch 83 connected to transformer 81. A resistor 90 prevents damage to tube 28. Filaments of tubes 84 and 28 are heated by conventional insulated filament transformers 91 and 92, respectively. The connection from the tube 84 to capacitor 85 by lead 93 is from center tap of the secondary of transformer 91.

The grid controlled tube 28 (Thyratron) prevents the capacitor 85 from discharging through said tube 28 due to the negative bias on the grid of said tube. When the negative bias is overcome tube 28 fires or passes current, discharging capacitor 85 into the water load 94. Grid leak capacitor 95 is in the grid to the cathode connection of tube 28. Lead 96 connects capacitor 85 to the anode circuit of tube 28. Grounding capacitor 97 is associated with source 80 to prevent radio interference. Switch 93 is held open until the tubes 84 and 88 are sufficiently heated to function properly when under load.

This construction and circuit produces peaked type of electrical waves in the water load. The number of such peaked type waves per minute, i. e., impulse frequency is determined and controlled by the adjustment of rheostat 87 thus regulating the time interval between impulses. The voltage of said impulses and application to the water load 94 is determined and controlled by setting of the tap switch 83.

For a more detailed description of the operation of the circuit shown in Figure 2, attention is directed to the following description. Inasmuch as device 84 provides a unidirectional conducting path, the condenser 85 is charged with a unidirectional voltage having a polarity indicated, the rate or time or number of alternations in the source 80 required to charge the condenser 85 to a predetermined unidirectional potential being determined by the magnitude of the adjustable resistance 87. When such unidirectional potential across the terminals of condenser 85 assumes such predetermined magnitude, the thyratron tube 28 is rendered conductive to thereby allow the energy stored in condenser 85 to flow in a serial circuit comprising the condenser 85, the anode and cathode of tube 28, and the water zone 94. The positive terminal of condenser 85 is connected to the anode of tube 28, and the filament or cathode of the same tube is connected to one of the electrodes 100, which may be grounded, the other electrode 101 being connected to the negative terminal of the condenser 85. The thyratron tube 28 is triggered or rendered alternatively conducting or non-conducting by connecting its grid to a terminal on the secondary winding of transformer 81 through the current limiting or protective resistance 90, and also by connecting such grid to its associated cathode through condenser 95. Upon application of voltage to the circuit thus far described, the condenser 85 is gradually charged until it assumes a predetermined potential, to cause the thyratron tube 28 to fire or to provide a heavy current conducting path therethrough. Upon firing of the tube 28, a current flows from the grid to the cathode to thereby charge the condenser 95 with a unidirectional potential having a polarity indicated in Figure 2, and as a result such control grid assumes a negative potential with respect to its cathode as the condenser 85 is discharged. This negative condition of the control grid is associated with the reduction in potential of condenser 85 causes device 28 to become non-conductive. Subsequently, the charge stored in condenser 95 discharges through the serial circuit comprising resistances 90 and 87, water zone 94 and cathode of tube 28, to thereby allow the device 28 to again become conductive when the unidirectional potential across condenser 85 assumes the predetermined magnitude. Resistance 90 not only serves as a current path through which condenser 95 may be discharged at a controlled rate, but also serves to limit the flow of grid current when and as the device 28 is being fired.

Fig. 3 indicates a capacitor 100A charged by a D. C. generator 101A and arranged to be discharged into water load 103 by operation of the switch 102. For purposes of simplification the circuit closer is indicated as operated by a cam 104 mounted on a shaft having a gear 105 driven from the D. C. generator 101A. In operation, when the circuit closer 102 is open the generator 101A charges the capacitor 100″. As the cam 104 rotates it closes the circuit closer 102 for a short time period of the cycle causing the capacitor to discharge to water load 103. Thus, the water load 103 is periodically subjected to electric impulses directly from the capacitor 100A, which is periodically charged with voltage from generator 101A.

Figure 4 indicates an impulse or peaking transformer 105A, which is constructed with a core 106, having an air gap 107 with a magnetic shunt 108 situated therein. The magnetic shunt 108 is of magnetizable material and serves to bridge or shunt a portion of the air gap, thereby altering the reluctance of the same. The primary winding 109 is supplied with current from a low frequency A. C. source 110, and the resulting voltage induced in the secondary winding 111 is applied to water load 112. Such voltage applied to the water load 112 is indicated in Figure 5, which shows a series of positive wave peaks 113 and negative peaks 114 which are produced by operation of the peaking transformer 105A in Figure 4 having an air gap 107 and magnetic shunt 108. The shape of the wave shown in Figure 5 comprising the series of peaks 113 and 114 is approximate and the time spacing of the peaks is dependent on the frequency of the A. C. source 110.

My improved construction of electrode arrangements are shown in a series of drawings, Figure 6, a water intake 115 is provided with a conventional trash rack or screen 116, which is usually substantial metal structure so set up as to form a good electrical ground. My energized electrified screen 117 is shown as made up of a row of rigid or flexible electrical conductors 118 mounted in insulators 119 forming a frame spaced from the trash rack 116.

In operation the insulated screen 117 is connected to the energized side of the electric energizing equipment and the trash rack 116 to the opposite side of such a supply, i. e., the trash rack 116 forms an electrical ground. An electrified zone of water is thus established between the trash rack 116 and energized screen 117 and extends outwardly beyond the screen 117.

Figure 7 illustrates a common type of valve 121 as the intake to a water tower 122 for a municipal water supply reservoir or lake in which a screen 123 serves as an ordinary protection for the intake. Usually the screen 123 and valve 121 form a good electrical ground, which I use. My improved grid 124 consists of conductive hoops and stringers spaced from the screen 123 by insulators 94A and secured thereto. The grid assembly 124 and screen 123 are attached to a hoisting chain 125 with insulator 126. The conducting cable 127 attached to grid 124 is connected to one terminal of the energizing unit and the screen ground connects to the other terminal.

In operation of the structure illustrated in Figure 7 the electrically energized grid 124 and grounded screen 123 produce a highly electrified zone between the screen and grid and a zone of lesser strength extending beyond the grid. The fish are hence diverted before they come in contact with the screen, though water may flow at a velocity sufficient to prevent fish once in contact with the screen from getting free. Hence with my protective electrical grid on the municipal intake screen, this inlet is kept open for water flow and there is no pollution from the decomposition of fish caught on the screen.

The impulse transformer, as indicated in Figure 4A, using stored magnetic energy may be supplied with rectified current from an A. C. source. Such rectified current may be considered to flow from a continuous current source 210 having its terminals connected to the primary winding of the transformer through an interrupter or timer 211. Interrupted continuous current applied to the primary winding of the transformer results in the appearance of a current in the water load 112. The current in the water load has a wave form 212 indicated in Figure 5A.

The ideal electrically charged zone should have a wave form with a minimum time length of current flow, sufficient to stop or divert fish. Any extension of the time length of current flow during each wave is a disadvantage, because more wattage is consumed, and since more wattage is consumed with extended uni-directional electric current, electrolysis of electrodes is increased.

In a capacitor discharge type of energizer, as described herein in Figures 1, 2 and 3, the lowering of load resistance with collection of mud or sediment on or against the electrodes, does not change the energy drawn from the capacitor. Changes in such load resistance will only change the discharge time period of the capacitor of the energizer. This feature prevents the overloading of my capacitor type of energizer under actual operating and field conditions. The wattage requirements of my capacitor type energizer remains constant, regardless of varying resistance of load at electrodes. This is a very important advantage under actual operating and field conditions.

When a water outlet or inlet employs an inverted pipe elbow or siphon, a suitable fish protector may be similar to that of Figure 7 inverted. It is understood that the term "electrical impulses free of any prolongations thereof" as used in the present specification and claim signifies electrical impulses of the shortest possible duration. Such impulses are obtained preferably by discharging a condenser into the water load circuit through circuit connections thereto substantially free of any extraneous resistance, inductance or capacity effects, all of which tend to prolong the period during which the condenser discharges.

I claim as my invention:

In the method of diverting animal forms of life, of the type described herein, in an electrified water zone defined by a pair of spaced electrodes, the step comprising: periodically energizing said electrodes with electrical voltage waves characterized by a sequence of peaked electrical impulses, each wave rapidly increasing to a maximum and rapidly decreasing immediately after said maximum is reached, the resulting electrical field intensity in said water zone during the time period of such peaked pulses being of sufficient intensity to appreciably affect said animal forms of life in regions remotely located from the path of greatest electrical conductivity between said electrodes.

HENRY T. BURKEY.

REFERENCES CITED

The following references are of record in the file of this patent:

UNITED STATES PATENTS

| Number | Name | Date |
| --- | --- | --- |
| 794,573 | Ward | July 11, 1905 |
| 1,016,451 | Smith | Feb. 6, 1912 |
| 1,690,440 | Baker | Nov. 6, 1928 |
| 1,974,444 | Burkey | Sept. 25, 1934 |
| 2,010,601 | Loughridge | Aug. 6, 1935 |
| 2,193,915 | Baker | Mar. 19, 1940 |
| 2,233,045 | Bonner et al. | Feb. 25, 1941 |
| 2,259,570 | Klumb | Oct. 21, 1941 |
| 2,426,037 | Mahoney et al. | Aug. 19, 1947 |

OTHER REFERENCES

McMillan, Bulletin of the Bureau of Fisheries, vol. XLIV, 1928, volume No. 1042.